(12) United States Patent
Ludolph et al.

(10) Patent No.: US 12,485,398 B2
(45) Date of Patent: Dec. 2, 2025

(54) APPARATUS FOR MIXING IN CATALYTIC CRACKER REACTOR

(71) Applicant: SHELL OIL COMPANY, Houston, TX (US)

(72) Inventors: Robert Alexander Ludolph, Houston, TX (US); Michael Allen Basden, Deer Park, TX (US)

(73) Assignee: SHELL USA, INC., Houston, TX (US)

(*) Notice: Subject to any disclaimer, the term of this patent is extended or adjusted under 35 U.S.C. 154(b) by 214 days.

(21) Appl. No.: 18/262,612

(22) PCT Filed: Feb. 1, 2022

(86) PCT No.: PCT/US2022/014687
§ 371 (c)(1),
(2) Date: Jul. 24, 2023

(87) PCT Pub. No.: WO2022/169739
PCT Pub. Date: Aug. 11, 2022

(65) Prior Publication Data
US 2024/0075444 A1    Mar. 7, 2024

Related U.S. Application Data

(60) Provisional application No. 63/146,422, filed on Feb. 5, 2021.

(51) Int. Cl.
*B01J 8/20* (2006.01)
*B01F 25/314* (2022.01)
(Continued)

(52) U.S. Cl.
CPC ............ *B01J 8/388* (2013.01); *B01F 25/3141* (2022.01); *B01F 25/31423* (2022.01);
(Continued)

(58) Field of Classification Search
CPC .......... B01F 2101/2204; B01F 25/3141; B01F 25/31423; B01F 25/31434; B01F 25/4318;
(Continued)

(56) References Cited

U.S. PATENT DOCUMENTS

| | | |
|---|---|---|
| 3,654,140 A | 4/1972 | Griffel et al. |
| 4,479,870 A | 10/1984 | Hammershaimb et al. |

(Continued)

FOREIGN PATENT DOCUMENTS

EP    0482055 B1    9/1993

OTHER PUBLICATIONS

International Search Report and Written Opinion received for PCT Patent Application No. PCT/US2022/014687, mailed on Apr. 26, 2022, 11 pages.

*Primary Examiner* — Ellen M McAvoy
*Assistant Examiner* — Chantel Graham
(74) *Attorney, Agent, or Firm* — SHELL USA, INC.

(57) ABSTRACT

The present invention provides a catalytic cracking reactor comprising a conduit, configured to allow the passage of a flow of catalyst particles, and an injection zone comprising a ring of feed injectors extending inwardly from the wall of reactor and angled to inject feed into the flow of catalyst particles, characterised in that the reactor also comprises a contacting device protruding into the reactor from the inner wall of said reactor upstream of the injection zone.

7 Claims, 5 Drawing Sheets

(51) Int. Cl.
  *B01F 25/431* (2022.01)
  *B01J 8/00* (2006.01)
  *B01J 8/18* (2006.01)
  *B01J 8/38* (2006.01)
  *C10G 11/18* (2006.01)
  *B01F 101/00* (2022.01)

(52) U.S. Cl.
  CPC .. *B01F 25/4318* (2022.01); *B01F 25/431971* (2022.01); *B01J 8/0025* (2013.01); *B01J 8/1854* (2013.01); *B01J 8/1872* (2013.01); *B01J 8/20* (2013.01); *C10G 11/18* (2013.01); *B01F 2101/2204* (2022.01); *B01J 2208/00849* (2013.01)

(58) Field of Classification Search
  CPC ..... B01F 25/431971; B01J 2208/00849; B01J 2219/0218; B01J 8/0025; B01J 8/1854; B01J 8/1872; B01J 8/20; B01J 8/388; C10G 11/18
  See application file for complete search history.

(56) References Cited

U.S. PATENT DOCUMENTS

| | | | |
|---|---|---|---|
| 4,832,825 A | 5/1989 | Mauleon et al. | |
| 5,173,175 A | 12/1992 | Steffens et al. | |
| 5,552,119 A | 9/1996 | Holmes | |
| 5,554,341 A | 9/1996 | Wells et al. | |
| 6,613,290 B1 * | 9/2003 | Senior | B01J 8/26 422/139 |
| 7,101,474 B2 | 9/2006 | Sattar | |
| 7,964,157 B2 * | 6/2011 | Dries | C10G 11/18 422/224 |
| 9,283,532 B2 | 3/2016 | Mehlberg et al. | |
| 2018/0185807 A1 | 7/2018 | Carroll | |

* cited by examiner

APPARATUS FOR MIXING IN CATALYTIC CRACKER REACTOR

CROSS REFERENCE TO RELATED APPLICATIONS

This is a National stage application of International Application No. PCT/US2022/014687. filed 1 Feb. 2022, which claims priority of U.S. Provisional Application No. 63/146,422, filed 5 Feb. 2021 which is incorporated herein by reference in its entirety.

FIELD OF THE INVENTION

The invention relates to an apparatus and a process that improves the dispersal of liquids into fluidised solids in a reactor. More particularly, the invention relates to an apparatus and a process for dispersing hydrocarbons into a stream of fluidised catalyst particles.

BACKGROUND OF THE INVENTION

In processes employing fluidized solid catalyst beds techniques, carbonaceous materials are often deposited on the catalyst particles within the bed. Often these processes are run on a cyclical basis wherein the spent catalyst solids are removed from the reactor and conveyed to another vessel where the carbonaceous materials are removed by combustion under an oxygen containing environment. This allows reuse of the catalyst once returned to the reactor.

An important process of this nature is the fluid catalytic cracking (FCC) process for the conversion of relatively high-boiling hydrocarbons to lighter hydrocarbons boiling in the heating oil or gasoline (or lighter) range. In this process, a hydrocarbon feed is contacted with a particulate cracking catalyst in a fluidised catalyst bed under conditions suitable for the conversion of hydrocarbons.

Modern FCC units typically use a pipe reactor in the form of a large, usually vertical, riser in which a gaseous medium upwardly transports the catalyst in a fluidized state. In some instances, however, a vertical reactor is used similarly but with a downwards flow.

For an efficient process, it is desirable for the hydrocarbon feed to be instantaneously dispersed throughout the stream of catalyst that is moving through the reactor. A complete and instantaneous dispersal of feed across the entire cross section of the reactor is not possible, but good results have been obtained by injecting a highly atomized feed into a pre-accelerated stream of catalyst particles. However, the dispersing of the feed throughout the catalyst particles takes some time, so that there is some non-uniform contact between the feed and catalyst as previously described. Non-uniform contacting of the feed and the catalyst exposes portions of the feed to the catalyst for longer periods of time which can in turn produce thermal cracking and reduce the quality of reaction products.

A number of different methods are used to maximise the dispersal of the hydrocarbon feed into the particulate catalyst suspension. Dividing the feed into small droplets improves dispersion of the feed by increasing the interaction between the liquid and solids. Preferably, the droplet sizes become small enough to permit vaporization of the liquid before it contacts the solids. It is also known to pre-accelerate the catalyst particles before contacting them with the hydrocarbon feed, such as in U.S. Pat. No. 4,479,870.

The hydrocarbon feed is injected into the reactor through a plurality of angled feed nozzles, typically arranged in a circumferential band around the reactor and injecting feed towards the centre of the riser. Said nozzles typically protrude into the reactor.

U.S. Pat. Nos. 5,554,341, 5,173,175, 4,832,825 and 3,654,140 all show the use of radially directed feed injection nozzles to introduce feed into an FCC riser. The arrangement of the nozzles maintains a substantially open riser cross-section over the feed injection zone and downstream riser sections. The angled feed nozzles are typical of those used to inject feed or other fluids at an intermediate portion in the riser conduit.

However, the angled feed nozzles typically extend away from the wall of the reactor and into the flow path of the catalyst. Passing particles over the nozzles at high velocity can result in erosion. Further, the protrusion of the nozzles into the reactor can result in quiescent zones in which catalyst is flowing but limited hydrocarbon feed is provided within the feed injection zone.

It is not desirable to recess the nozzles completely into the wall of the reactor and remove them from the catalyst flow path. This solution is not satisfactory since the feed injector tips are specifically designed to provide a relatively uniform coverage of the hydrocarbon feed over the cross-section of the reactor by expanding the pattern of feed injection as it exits from the nozzle. Completely recessing the tips of the injector nozzles within the wall of the reactor disrupts the ability to obtain a spray pattern over the majority of the riser cross-sectional area.

U.S. Pat. No. 7,101,474 describes a modified FCC riser in which the thickness of the riser walls below the feed injection area is increased to provide a narrower catalyst particle flow past the nozzles. This requires new riser construction.

It is an object of this invention to provide a simple apparatus and method to more uniformly distribute catalyst and oil over the cross-section of the reactor.

SUMMARY OF THE INVENTION

Figure 1:
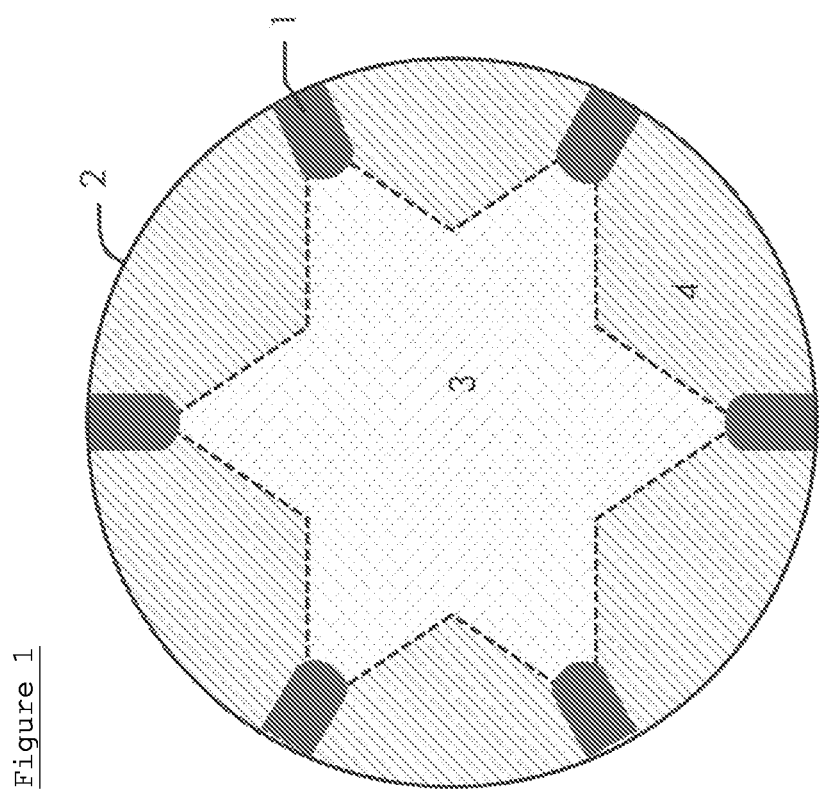
FIG. 1 illustrates an example of a prior art injection zone in an FCC riser.

The present invention provides a catalytic cracking reactor comprising a conduit, configured to allow the passage of a flow of catalyst particles, and an injection zone comprising a ring of feed injectors extending inwardly from the wall of reactor and angled to inject feed into the flow of catalyst particles, characterised in that the reactor also comprises a contacting device protruding into the reactor from the inner wall of said reactor upstream of the injection zone.

The present invention also provides a method of mixing a stream of fluidised catalyst particles with a hydrocarbon feed, said method comprising the steps of:
a) creating a stream of fluidised catalyst particles in a reactor;
b) passing said stream of fluidised catalyst particles past a contacting device protruding into the reactor from the inner wall of said reactor;
c) subsequently passing the stream of fluidised catalyst particles through an injection zone comprising a ring of feed injectors extending inwardly from the wall of reactor and contacting said stream of fluidised catalyst particles with hydrocarbon feed provided through said feed injectors;

d) passing the stream of fluidised catalyst particles contacted with hydrocarbon feed to a downstream section of the reactor to convert the hydrocarbon feed to a converted product in the presence of the catalyst particles.

DETAILED DESCRIPTION OF THE INVENTION

The present inventors have determined that providing a contacting device in a reactor upstream of the ring of feed injectors, through which the hydrocarbon feed is provided to the reactor, results in improved mixing of the hydrocarbon feed with a fluidised flow of catalyst particles. The invention provides a simple solution to the problem of providing a rapid and uniform dispersal of hydrocarbon feed into a fluidised flow of catalyst particles.

The reactor is suitably a reactor for use in a fluidised catalytic cracking (FCC) process. In such a process, finely divided catalyst particles are provided to the reactor and fluidised by addition of a fluidising medium. The catalyst particles may be fresh catalyst particles or regenerated catalyst particles or a mixture thereof. The fluidising medium may be a diluent material, typically steam or low molecular fluidizing gas, of a hydrocarbon stream. The fluidised catalyst stream flows through the reactor. The reactor may be a 'downer' reactor in which the fluidised catalyst stream flows downwardly through the reactor. Preferably, the reactor is a riser reactor and the fluidised catalyst stream flows upwardly through the riser reactor.

In the present invention, a contacting device is provided in the reactor upstream of a ring of feed injectors. The fluidised catalyst stream, therefore, is brought into contact with said contacting device before passing into an injection zone.

The contacting device comprises an insert that is securely fastened to the wall of the reactor. Typically, the contacting device comprises an annular element with an outer diameter equal to that of the inner diameter of the reactor.

The contacting device may comprise metal, ceramics, ceramets or mixtures thereof. In one embodiment of the invention, the contacting device comprises a composite of refractory material and a metal structure. In this embodiment, the metal structure may be connected to the outer wall of the reactor to ensure that the location of the contact device does not change during operation despite temperature shocks. Further, the metal structure provides reinforcement to the combination of a metal structure and refractory material so that it becomes stronger and less prone to erosion. This is particularly advantageous when the reactor has been provided with an internal refractory lining.

In view of the erosive nature of the reactor mixture the refractory material is suitably selected such that it is highly wear resistant. The material is preferably also tastable to facilitate the shaping of the contact devices. Suitably the refractory material is selected from the group consisting of alumina, silica, calcium oxide, titanium oxide, magnesium oxide, iron oxide and mixtures thereof. Also the refractory may contain phosphorus oxide.

The contacting device may be of any cross-sectional shape that the skilled person deems suitable for a specific use. The skilled person will optimise the advantages, in particular the turbulence effects, whilst minimising any disadvantage, such as pressure drop. In certain embodiments, the contacting device may have the cross-sectional profile of a rectangle. In other embodiments non-rectangular cross-sections may be desirable. For examples, a tapered shape angled out from the reactor's inner wall may be suitable. Suitable devices are described in U.S. Pat. No. 9,283,532, WO2017/003991 and WO2008017660.

When the contacting device is in the shape of an annulus, the whole annulus may be assembled in one piece. However, it is advantageous to assemble such an annulus in more than one module. This is not only easier to assemble, but it also provides the possibility of local repair. In this embodiment, the number of modules suitably ranges from 4 to 25.

A particular advantage of the present invention is that contacting devices constructed in this manner may be retrofitted to reactors, allowing improvement of existing reactors without the need for major reconstruction. The contacting device is positioned upstream of the ring of feed injectors. Typically, the contacting device will be place immediately upstream of the ring of feed injectors. Preferably the distance between the downstream edge of the contacting device and the upstream edge of the feed injectors is not more than 25 inches (63.5 cm). The distance between the downstream edge of the contacting device and the upstream edge or underside of the feed injectors will depend on the geometry of the reactor and whether the reactor is swaged or not and can be altered depending on both the geometry and flow conditions within the reactor.

The position of the contacting device upstream of the ring of feed injectors diverts the flow of catalyst particles to match more closely the dispersion of the hydrocarbon feed from the feed injectors. The contacting device will reduce the passageway in the reactor. Preferably, the passageway is reduced by not more than 35 percent, based on the passageway of the reactor upstream of the contacting device. Suitably, the reduction of the passageway is at least 10 percent, based on the passageway of the reactor upstream of the contacting device.

The position of the contacting device upstream of the ring of feed injectors provides the added advantage of protecting the feed injectors themselves from erosion and damage caused by the flow of catalyst particles.

The feed injectors may comprise any suitable feed injection nozzles. In typical FCC practice, the feed exits the nozzles as a spray in a fan pattern. The nozzles are usually angled to tip the fan pattern in a downstream direction. The angle of the nozzles will typically be in a range of from of at least 20° and less than 70° with respect to a transverse plane passing through the nozzles, liquid entering the injectors.

Within the injection zone, the fluidised catalyst particles are contacted with the hydrocarbon feed provided through the feed injectors. The present invention allows excellent rapid dispersal of the feed throughout the catalyst particles.

The stream of fluidised catalyst particles contacted with the hydrocarbon feed are then passed downstream of the injection zone and the hydrocarbon feed is converted to a converted product in the presence of the catalyst particles. This may occur as part of the flow through the reactor or, in some embodiments, may occur at least in part within a catalyst bed disposed within a downstream section of the reactor.

DETAILED DESCRIPTION OF THE DRAWINGS

The invention will now be further described with reference to the exemplary, non-limiting drawings.

FIG. 1 illustrates the problem to be overcome by the present invention. FIG. 1 shows a cross section of a riser reactor at the injection zone. A number of feed injectors (1) protrude from the inner wall of the riser reactor (2). The combined spray pattern (3) in a typical reactor set up is shown. This leads to a quiescent zone (4) in which the stream of fluidised catalyst particles passing up through the injection zone contacts a reduced level of feed.

Figures 2A, 2B:
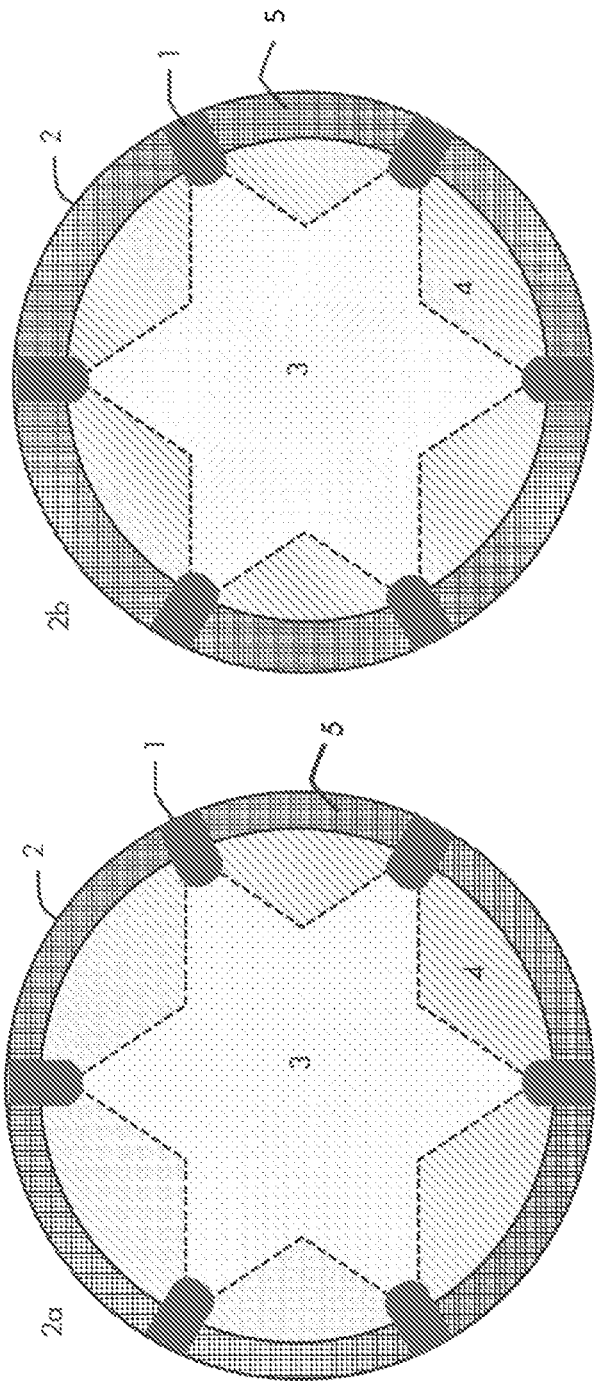
FIGS. 2a and 2b illustrate contacting devices according to the present invention.

FIGS. 2a and 2b illustrate the invention. A contacting device (5) is provided upstream of the injection zone. In FIG. 2a, the area of passageway for the fluidised catalyst particles is reduced by the contacting device by 23% based on the passageway of the riser reactor upstream of the contacting device. In FIG. 2b, the area of passageway for the fluidised catalyst particles is reduced by the contacting device by 31% based on the passageway of the riser reactor upstream of the contacting device. In both Figures, it can clearly be seen that the area of quiescent zone (4) is considerably reduced when compared with FIG. 1.

Figure 3:
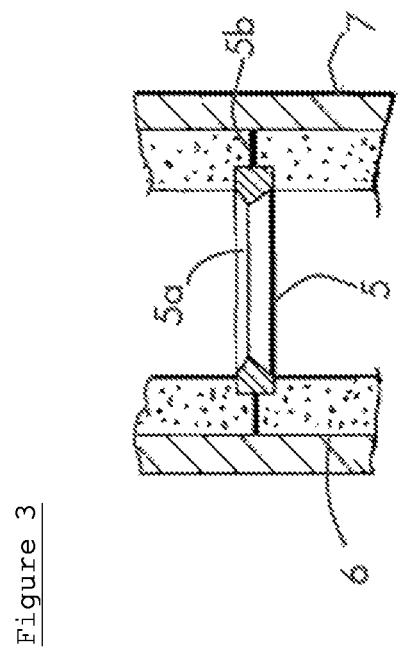
FIGS. 3 and 4 illustrate a suitable contacting device.

FIG. 3 illustrates a contacting device (5), comprising a section (5a) constructed of refractory material connected via metal structures (5b) through the inner wall (6) of a riser reactor to the outer metal wall (7) of said reactor.

Figure 4:
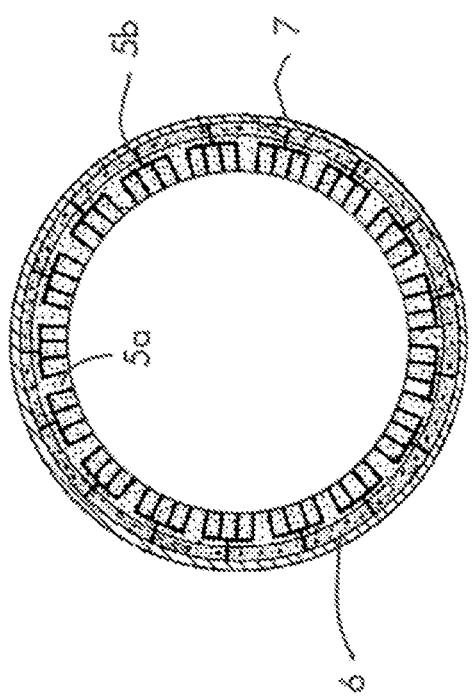

A different cross-sectional view of the same contacting device is shown in FIG. 4.

Figure 5:
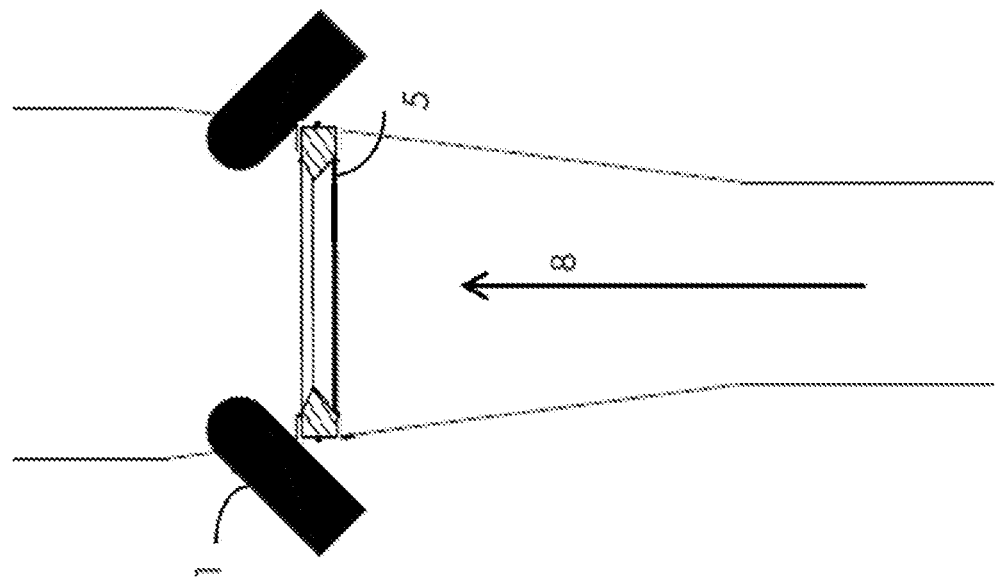
FIG. 5 illustrates a part of a catalytic cracking riser reactor of the present invention.

FIG. 5 illustrates a view within the reactor illustrating the contacting device (5) protruding into the reactor upstream of the feed injectors (1). The flow of the stream of fluidised catalyst particles (8) passes the contacting device upstream of the injection zone. Within the injection zone, the feed injectors (1) provide a hydrocarbon feed and said hydrocarbon ked is contacted with said fluidised catalyst particles.

EXAMPLES

The following non-limiting examples are provided as further description of the present invention.

The invention was tested using a computational fluid dynamics (CFD) simulation. The modelling was configured to represent a standard riser reactor configuration and process conditions. The same basic riser reactor and process conditions were used for each scenario, except for the modifications described for each scenario. Four different scenarios were modelled. In scenario 1 (base case; comparative) an unmodified riser reactor was simulated. In scenario 2, a contacting device was added upstream of the feed injectors. Scenario 3 (comparative) involved a reduction in the diameter of the riser reactor upstream of the feed nozzles. Scenario four adapted scenario 3 with the addition of a contacting device upstream of the feed nozzles. The results of the simulations are shown in Table 1.

TABLE 1

| | wt % of feedstock vaporized within 0.2 seconds of injection by feed nozzles | wt % of unvaporized feedstock remaining 0.2 seconds after injection by feed nozzles |
| --- | --- | --- |
| Scenario 1 | 93.0 | 7.0% |
| Scenario 2 | 95.1% | 4.9% |
| Scenario 3 | 94.7% | 5.3% |
| Scenario 4 | 96.2% | 3.8% |

Adding a contacting device upstream of the feed nozzles in scenario 2 was clearly shown in these simulations to increase feedstock vaporization by over 2 wt % through better contacting of the injected oil with the hot flowing catalyst when compared with scenario 1. Some, but not all, of this improvement can be achieved (scenario 3) by replacing the lower section of the riser with one with a lower diameter. However, the addition of a contacting device (e.g. scenario 2) does not require a replacement of the lower section of the riser and can be retro-fitted to an existing reactor.

Even further benefit was demonstrated by the combination of a smaller lower riser and a contacting device (scenario 4).

We claim:

1. A fluid catalytic cracking riser reactor comprising a conduit, configured to allow the passage of a flow of catalyst particles, and an injection zone comprising a ring of feed injectors extending inwardly from the wall of reactor and angled to inject feed into the flow of catalyst particles, characterised in that the reactor also comprises a contacting device protruding into the reactor from the inner wall of said reactor upstream of the injection zone, wherein the contacting device comprises an annular element with an outer diameter equal to that of the inner diameter of the reactor.

2. A fluid catalytic cracking riser reactor according to claim 1, wherein the contacting device comprises a composite of refractory material and a metal structure.

3. A fluid catalytic cracking riser reactor according to claim 1, wherein the distance between the downstream edge of the contacting device and the upstream edge or underside of the feed injectors is not more than 25 inches (63.5 cm).

4. A fluid catalytic cracking riser reactor as claimed in claim 1, wherein the cross-sectional area of the flow of catalyst particles is reduced by at least 10% and not more than 35%, based on the cross-sectional area of the reactor upstream of the contacting device.

5. A fluid catalytic cracking riser reactor as claimed in claim 1, wherein the reactor is a riser reactor configured to allow the upwards passage of a flow of catalyst particles.

6. A method of mixing a fluidised stream of catalyst particles with a hydrocarbon feed, said method comprising the steps of:
   a) creating a stream of fluidised catalyst particles in a fluid catalytic cracking riser reactor;
   b) passing said stream of fluidised catalyst particles past a contacting device protruding into the reactor from the inner wall of said reactor, wherein the contacting device comprises an annular element with an outer diameter equal to that of the inner diameter of the reactor;
   c) subsequently passing the stream of fluidised catalyst particles through an injection zone comprising a ring of feed injectors extending inwardly from the wall of reactor and contacting said stream of fluidised catalyst particles with hydrocarbon feed provided through said feed injectors;
   d) passing the stream of fluidised catalyst particles contacted with hydrocarbon feed to a downstream section of the reactor to convert the hydrocarbon feed to a converted product in the presence of the catalyst particles.

7. A method as claimed in claim 6, wherein the hydrocarbon stream comprises high boiling hydrocarbons and the converted product comprises lighter hydrocarbons boiling in the heating oil, gasoline or lighter range.

* * * * *